May 26, 1970  P. M. GUNDLACH ET AL  3,514,639

VARIABLE CONDUCTION ANGLE POLYPHASE SYNCHRONIZATION CIRCUIT

Filed Oct. 17, 1966

Inventor
PHILIP M. GUNDLACH
ROBERT D. MUNSON
By
Attorney

Inventor
PHILIP M. GUNDLACH
ROBERT D. MUNSON
By
Attorney

United States Patent Office 3,514,639
Patented May 26, 1970

1

3,514,639
VARIABLE CONDUCTION ANGLE POLYPHASE SYNCHRONIZATION CIRCUIT
Philip M. Gundlach, Belleville, Ill., and Robert D. Munson, Jennings, Mo., assignors to Emerson Electric Co., St. Louis, Mo., a corporation of Missouri
Filed Oct. 17, 1966, Ser. No. 587,296
Int. Cl. H03k 5/00, 17/00
U.S. Cl. 307—269                                       6 Claims

ABSTRACT OF THE DISCLOSURE

A control circuit for generating signals synchronized with the phases of a polyphase alternating current, at variable conduction angles, having particular use as a gating circuit for controlling the firing angles and synchronizing the firing pulses for a full wave three-SCR bridge-type three phase AC rectifier. Each of three identical firing circuits, each connected to one phase of the current, including a capacitor charged by a single constant current source, a shunting switch connected to a line carrying the respective phase associated with the firing circuit, and a sensing means for sensing the ramp voltage generated at the capacitor when the switch is open and comparing this voltage with a variable control voltage. The switch is preferably a transistor having its base connected to a line synchronized with a phase of the current, and the voltage sensing means is a transistor having its base connected to the capacitor and a variable control voltage applied to its emitter.

---

This invention relates to a control circuit for generating signals synchronized with the phases of a polyphase alternating current, at variable conduction angles. Such a circuit is known as a synchronization circuit. It has particular utility in controlling firing angles and synchronizing firing pulses for the three silicon controlled rectifiers (SCR's) of a full wave 3-SCR bridge used to rectify three phase alternating current to variable pulsed direct current, but its utility is not limited thereto.

When 3-phase AC is the current source for a DC motor, the current is conveniently rectified and the speed of the motor is conveniently controlled by a full wave 3-SCR bridge, with each SCR controlled by a different phase. The theory of such bridges is discussed in Westinghouse Electric Corporation, Silicon Controlled Rectifier Designers' Handbook (1st edition 1964), chapter 7, 23–40 (7–23 to 7–40). The speed at a given load of such a motor is a direct function of the average voltage applied to the motor. If any part of each cycle is chopped off, the average voltage is reduced, and the speed of the motor is accordingly reduced. When firing of each SCR of a 3-SCR bridge is delayed through part of a cycle of its phase, less of the cycle is applied to the motor, and hence the motor runs slower. If this delay can be varied from a negligible period to a period equal to or greater than an entire half cycle, then the firing angle of the SCR can be varied from 180° to 0° and the speed of the motor can be varied from full speed to stall.

It is important that each SCR of a 3-SCR bridge have the same firing angle as the others. When all of the firing angles are the same, the SCR's will fire exactly 120° apart, and are thus synchronized with the phases of the alternating current. This synchronization is obtained by means of a synchronization circuit.

Heretofore, synchronization circuits for obtaining SCR firing pulses for 3-SCR bridges have tended to be bulky, to be affected by temperature, and to be dependent for proper synchronization on the specific characteristics of so many components that the firing control for each SCR has had to be adjusted individually to obtain synchronization. For example, in the circuit shown in FIGURES 7–45 of the Westinghouse Electric Corporation's Silicon Controlled Rectifier Designers' Handbook (1st edition 1964), bulky, expensive magnetic components are used. In the circuit shown in FIGURE 8.16 of the General Electric Rectifier Components Dept's SCR Manual (2nd edition 1961), in which transistors $Q_2$ control the rate of charging of capacitors $C_2$ and the voltage picked off at a fixed value by unijunction transistors $Q_3$, the synchronization of the signal circuits depends upon not only each of these components but also upon several resistors as well. Consequently, potentiometers $R_5$ must be adjusted to achieve synchronization, that is equal firing angles.

One of the objects of this invention is to provide a synchronization circuit which is simple, inexpensive to manufacture, and reliable in use.

Another object of this invention is to provide such a synchronization circuit in which the conduction angle is steplessly variable from 0° to 180°.

Still another object of this invention is to provide a synchronization circuit having a signal circuit for each phase of alternating current in which the synchronization of signal circuits is dependent on the precision of only two components in each signal circuit, and thus may be made so as to require no adjustment to generate synchronized signals.

Still another object of this invention is to provide a synchronization circuit which emits synchronized signals over a wide temperature range.

Other objects will become apparent to those skilled in the art in the light of the following description and accompanying drawings.

In accordance with this invention generally stated a synchronization circuit is provided having a plurality of signal circuits each of which has a capacitor and a switch electrically connected in parallel to a source of constant non-variable direct current. The switch is electrically connected to and controlled by one phase of a polyphase alternating current, so that it is closed during one half cycle and open during the other. For example, it may be closed during the 180° that its phase is positive with respect to neutral and open when it is negative with respect to neutral. The ramp voltage generated by the capacitor when the switch is open may be compared at the emitter-base junction of a transistor with a variable control voltage applied to the emitter of the transistor and used to trigger a signal when it exceeds the control voltage by a set value. The signal may then be translated into a firing pulse for an SCR by a suitable pulse forming circuit. The signal circuits may be kept in synchronization by providing them with identical capacitors, and by maintaining the constant current sources identical, which may be accomplished by attaching all of them in parallel to a single high voltage source and providing them with identical resistors.

In the drawing, FIG. 1 is a diagram view of a simple form of synchronization circuit of this invention;

Figure 1:
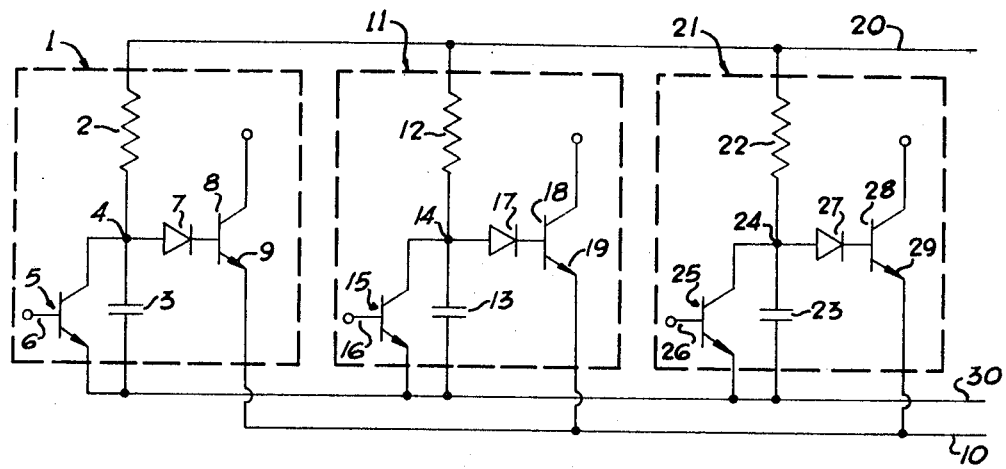

Referring now to FIG. 1 for a simplified version of synchronization circuit of this invention, reference numerals 1, 11 and 21 indicate signal circuits electrically connected in parallel to a line 20 from a source of constant voltage not shown, and to a common ground 30. In signal circuit 1, a resistor 2 is electrically connected at one of its ends to the line 20. At its other end the resistor 2 is electrically connected to one side 4 of a capacitor 3, the other side of which is electrically connected to the ground 30. Side 4 of the capacitor 3 is also electrically connected to the collector of a transistor 5 the emitter of which is electrically connected to the ground 30 and the base of which is electrically connected to a line 6 from a source of one phase of a 3-phase AC current not here shown. Also connected to the side 4 of the capacitor 3 is a diode 7 which is electrically connected in series with the base of a transistor 8. An emitter 9 of the transistor 8 is electrically connected to a line 10 from a source of variable voltage DC not here shown. The variable voltage source may be a manual speed control or may be part of a feedback system. The collector of the transistor 8 is electrically connected to a source of positive voltage, which may be part of a triggering circuit for an SCR. Signal circuits 11 and 21 are identical with signal circuit 1. Transistor 15 corresponds to transistor 5 and is connected at its base to a line 16 from a source of another phase of the same 3-phase AC current. Line 26, electrically connected to the base of transistor 25, carries the third phase. Each of the other components of signal circuits 11 and 21 is exactly the same as the corresponding component in signal circuit 1. However, as will be explained hereinafter, to obtain synchronized pulses it is only essential that resistors 2, 12 and 22 and capacitors 3, 13, and 23 be close tolerance components. Normal variations in the other corresponding components will not affect the synchronization.

All of the signal circuits operate in the same way, which can be illustrated by reference to signal circuit 1. During the half cycle in which the phase of the AC current carried by line 6 is positive with respect to neutral, transistor 5 is turned on and therefore the capacitor 3 is discharged and the voltage at the side 4 of the capacitor 3 is zero. When the polarity of line 6 reverses, the transistor 5 is turned off. The voltage across the capacitor 3 then increases linearly until the diode 7 is forward biased and turns the transistor 8 on. This point is reached when the voltage at the side 4 of the capacitor 3 exceeds that at the emitter 9 of the transistor 8 by a fixed amount, dependent on the diode drops associated with the diode 7 and the transistor 8. The turning on of the transistor 8 acts as a signal, which may conveniently be detected as a drop in a voltage applied to its collector.

If the control voltage at the emitter 9 of the transistor 8 is low, then the diode 7 is forward biased very soon after the transistor 5 turns off. This corresponds to a conduction angle very near 180°. If the control voltage is high, then the voltage across the capacitor 3 must rise until the diode 7 is forward biased. This corresponds to a conduction angle nearer zero degrees. If the control voltage is held higher than the voltage across the capacitor 3 rises during the time the transistor 5 is off, then transistor 8 will not turn on at all. This corresponds to a conduction angle of zero degrees.

When the polarity of line 6 again becomes positive, the transistor 5 is turned on, the capacitor 3 is discharged, the transistor 8 is turned off, and the cycle begins again. Signal circuits 11 and 21 operate in precisely the same way in response to their respective phases of the three phase AC current.

It will be noted that each set of transistors 5, 15 and 25 and transistors 8, 18 and 28 need only turn on and off at the same applied base voltage, and therefore that they need not be very close tolerance components. Likewise diodes 7, 17 and 27 need not be of close tolerance. The slope of the ramp voltage generated at the sides 4, 14 and 24 of the capacitotrs 3, 13 and 23 is a function solely of the voltage applied to the line 20 and of the resistance of the resistors 2, 12 and 22 and the capacitance of the capacitors 3, 13 and 23. If these components are of close tolerance, then the slope of each ramp voltage will be identical even if the voltage applied to the line 20 should vary, and at any given control voltage the transistors 8, 18 and 28 will turn on exactly 120° apart. It will also be noted that these synchronized signals can be produced a conduction angle which is continuously variable by the simple expedient of providing a continuously variable control voltage through line 10. It will also be noted that so long as each of the signal circuits 1, 11 and 21 is exposed to the same temperature, the critical characteristics of each component for the purposes of the signal circuits will not vary from one another significantly.

Figure 2:
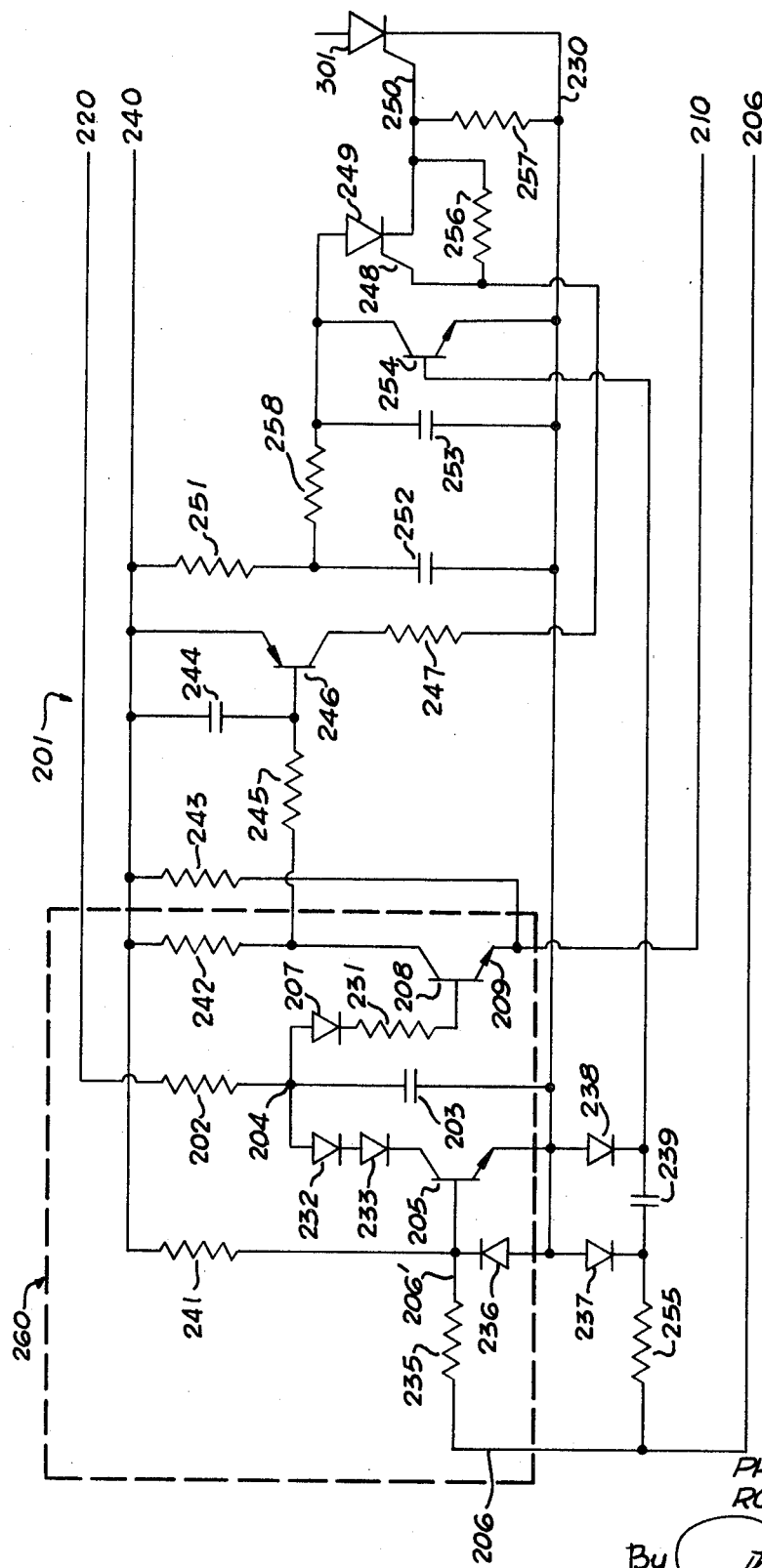
FIG. 2 is a diagrammatic representation of a single signal circuit of the synchronization circuit of the preferred form of this invention.

Referring now to FIG. 2 for one of the signal forming circuits of the preferred embodiment of the synchronization circuit of this invention, as applied, illustratively, to a firing circuit for an SCR, reference numeral 201 refers to a firing circuit for firing one SCR 301 of an SCR firing bridge. The signal circuit 260 is similar to each of the simplified circuits 1, 11 and 21. One end of a resistor 202 is electrically connected to a source of constant voltage through a line 220. Its other end is connected: to one side 204 of a capacitor 203, the other side of which is electrically connected to the ground 230; to a pair of diodes 232 and 233 which are electrically connected in series to the collector of a transistor 205 the emitter of which is electrically connected to the ground 230 and the base of which is electrically connected to an electrical conductor 206' which is electrically connected through a resistor 235 to a line 206 carrying one phase of a 3-phase AC current from a source not here shown; and to a diode 207 and a resistor 231 electrically connected in series to the base of a signal output transistor 208 an emitter 209 of which is electrically connected to a line 210 from a source of variable voltage DC not here shown. The diodes 232 and 233 off-set the two 0.6 v. diode drops associated with the diode 207 and the transistor 208 by keeping a constant 1.2 v. potential across the capacitor 203, and thus allow full conduction with the emitter 209 of the transistor 208 at 0 volts. The resistor 231 is added to limit current through the transistor 208 into the control voltage line 210. The electrical conductor 206' between the resistor 235 and the transistor 205 is electrically connected to a line 240 from a source of direct current not here shown through a large resistor 241, to lock the transistor 205 on if the phase carried by the line 206 is lost. Conductor 206' is also connected to the ground line 230 through a diode 236, to protect the transistor 205.

The rest of the firing circuit is of a more conventional design. The emitter 209 of the signal output transistor 208 is electrically connected to a source of variable voltage DC through the line 210. It is also electrically connected through a resistor 243 to the line 240 from a source of constant voltage DC not here shown, to prevent the transistor 208 from giving an output signal if voltage is lost through line 210. The collector of the signal output transistor 208 is electrically connected to the line 240 through a resistor 242. The collector of the signal output transistor 208 is also electrically connected through a resistor 245 to one side of a capacitor 244, the other side of which is electrically connected to the line 240, and to the base of a triggering transistor 246. The capacitor 244 protects against stray currents turning on the triggering transistor 246. The emitter of the triggering transistor 246 is electrically connected to the line 240, and its collector is electrically connected through a resistor 247 to the gate 248 of a triggering SCR 249. One side of the triggering SCR 249 is electrically connected to its gate 248 through a resistor 256, to the ground 230 through a resistor 257, and to the gate of the SCR 301 which is to be fired, through a line 250. The resistors 256 and 257 act as shunts for leakage currents and thus prevent accidental firing of SCR 249 and SCR 301 respectively. The other side of the triggering SCR 249 is electrically connected: to the collector of a reset transistor 254, the emitter of which is electrically connected to the ground 230; to one side of a capacitor 253, the other side of which is electrically connected to the ground 230; and to one side of a resistor 258. The other side of the resistor 258 is electrically connected to one side of a capacitor 252, the other side of which is electrically connected to the ground 230, and to the DC line 240 through a resistor 251. The base of the reset transistor 254 is electrically connected to the ground 230 through a diode 238 and to one side of a capacitor 239. The diode 238 protects the reset transistor 254. The other side of the capacitor 239 is electrically connected to the ground 230 through a diode 237 and, through a resistor 255, to the line 206, carrying one phase of the 3-phase AC.

Merely by way of illustration, and not by way of limitation, components of the following values or character may be used in the illustrative circuit described and illustrated.

| Reference numeral: | Value or description |
|---|---|
| 202 | 1.5 megohms. |
| 203 | 0.1 microfarad. |
| 205 | Typically 2N3393. |
| 207 | Typically 10D2. |
| 208 | Typically 2N3393. |
| 231 | 6,800 ohms. |
| 232 | Typically 10D2. |
| 233 | Do. |
| 235 | 22,000 ohms. |
| 236 | Typically 10D2. |
| 237 | Do. |
| 238 | Do. |
| 239 | 0.1 microfarad. |
| 241 | 100,000 ohms. |
| 242 | 22,000 ohms. |
| 243 | 10,000 ohms. |
| 244 | 1.0 microfarad. |
| 245 | 10,000 ohms. |
| 246 | Typically 2N3638. |
| 247 | 3,300 ohms. |
| 249 | Typically 2N1595. |
| 251 | 680 ohms. |
| 252 | 2.2 microfarads. |
| 253 | 0.47 microfarad. |
| 254 | Typically 2N3053. |
| 255 | 6,800 ohms. |
| 256 | 470 ohms. |
| 257 | 47 ohms. |
| 258 | 150 ohms. |

The voltage sources at the various input lines may have the following values:

| Line: | Voltage |
|---|---|
| 206 | volts AC 25 |
| 210 | volts DC 0–10 |
| 220 | do 150 |
| 240 | do 15 |

In the operation of the firing circuit in FIG. 2, signals are generated by the signal circuit 201 in much the same way as in the simplified circuits 1, 11, and 21 in FIG. 1. During the 180° that the line 206 is positive with respect to neutral the transistor 205 is turned on, the voltage at the one side 204 of capacitor 203 is 1.2 volts because of the diodes 232 and 233, and the transistor 208 is turned off. When the line 206 becomes negative with respect to neutral the transistor 205 is turned off, the capacitor 203 begins to charge, the voltage at the side 204 of the capacitor 203 begins to rise, and when the voltage at the base of the transistor 208 exceeds the voltage from the control line 210 at its emitter 209 by 0.6 volt the transistor 208 turns on. During the first 90° that the voltage in the line 206 is positive with respect to neutral the transistor 254 is turned on through the resistor 255 and the capacitor 239. The capacitors 252 and 253 are discharged during this time and the SCR 249 is turned off. The reset transistor 254 is then turned off for the remaining 270° of the cycle. The capacitors 252 and 253 charge rapidly and remain charged for the rest of the cycle. When the signal output transistor 208 is turned on the capacitor 244 is charged, the transistor 246 is turned on, the triggering SCR gate 248 is activated and charge stored in the capacitors 252 and 253 is applied through the triggering SCR 249 to the gate of the SCR 301. The firing circuit resets when the voltage in the line 206 again becomes positive with respect to neutral.

Figure 3:
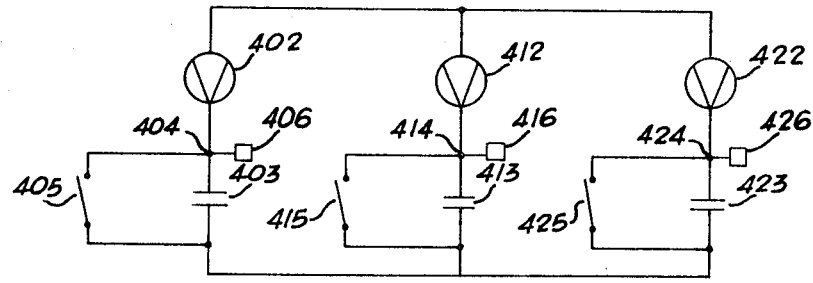
FIG. 3 is a diagrammatic view showing essential features of the synchronization circuit of this invention.
Figure 4:
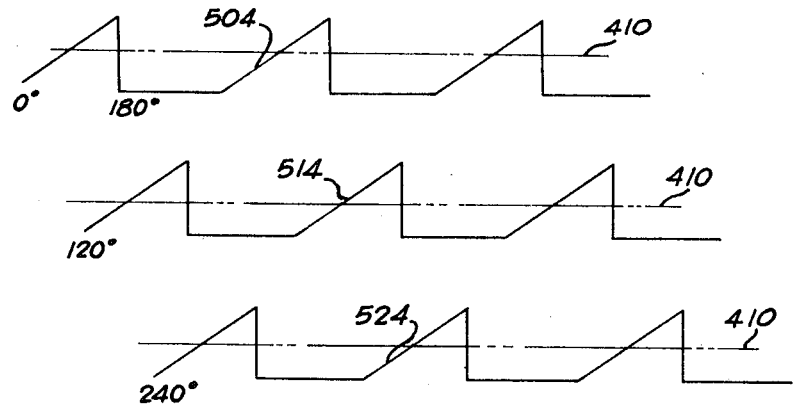
FIG. 4 is a graph illustrating the phase relationship among the three voltages generated by the signal circuits shown in FIG. 3.

Numerous variations in the synchronization circuit of this invention within the scope of the appended claims will occur to those skilled in the art in the light of the foregoing disclosure. The types of variations can best be appreciated by reference to FIG. 3, which shows the essential features of the synchronization circuit of this invention. Sources of identical current 402, 412 and 422 charge identical capacitors 403, 413 and 423 respectively when their respective AC cycle responsive switches 405, 415 and 425 are open; identical ramp voltages 504, 514 and 524 are generated at one side 404, 414 and 424 of the capacitors 403, 413 and 423 when their respective switches 405, 415 and 425 are open, as shown in FIG. 4; and sensing means 406, 416 and 426 sense the magnitude of each voltage 504, 514 and 524 and give a signal at a variable predetermined voltage 410.

It will be seen that the constant current sources 402, 412 and 422 although hereinbefore described as large fixed resistors fed by a common high voltage source, can be of numerous other constructions.

Likewise the AC cycle sensitive switches 405, 415 and 425, although hereinbefore illustrated as transistors, may be any voltage sensitive components, for example SCR's. Although it is preferred that the switches be closed throughout an entire half cycle and open throughout the other half cycle, they may be closed during any part of the cycle and open during the rest of the cycle, so long as each turns off at precisely the same angle as the others. Thus, for example, the switches 405, 415 and 425 might be adapted to open before their respective phases become negative with respect to neutral, and close at any time during the half-cycle in which their respective phases are positive with respect to neutral, so long as they all open exactly 120° apart. Conversely, the switches may close during the half cycles in which their respective phases are negative with respect to neutral, that is at some point in the course of the negative half cycle. It is, of course, preferred to have each switch open throughout an entire half cycle of its phase so that its capacitor is charged by its constant current source throughout this half cycle. This allows full control of the output conduction angle from 0°–180°.

Various adjustable voltage sensitive means are also known, and may be used to pick off the desired ramp voltage at 404, 414 and 424. The voltage sensitive means 406, 416 and 426 preferably should not affect the ramp voltages 504, 514 and 524 before they pick off the voltage desired, but may, of course, affect the ramp voltage thereafter. In the illustrative embodiment described, the ramp voltage increases linearly until the output transistor 208 is turned on and then levels off until the cycle sensitive switch closes.

Numerous other variations within the scope of the appended claims will occur to those skilled in the art in the light of the foregoing disclosure. The components illustrated, however, have the advantages of being inexpensive, easy to make to sufficient tolerances, and intrinsically uniform in their response to temperature.

Having thus described the invention, what is claimed and desired to be secured by Letters Patent is:

1. A synchronization circuit for generating signals synchronized with the phases of a polyphase alternating current, comprising:

(a) a source of constant, non-variable direct current;
(b) a variable control voltage source;
(c) a plurality of signal circuits, each one of said signal circuits being associated, respectively, with each phase of said polyphase alternating current, each of said signal circuits comprising;
(1) a capacitor charged by said source of constant, non-variable direct current throughout a constant portion of each cycle of its associated phase of said polyphase alternating current, and
(2) voltage sensing means for comparing the charge on said capacitor with said variable control voltage source,
(d) means connecting each of said voltage sensing means to said variable control voltage source.

2. The synchronization circuit of claim 1 wherein said capacitor is connected electrically in parallel with an electrical switch, said switch being electrically connected to a source of alternating current, said switch being adapted to be open during one half cycle of said alternating current and be closed during the half cycle of said alternating current.

3. The synchronization circuit of claim 2 wherein said switch is a transistor, a base of said transistor being electrically connected to said source of alternating current.

4. The synchronization circuit of claim 1 wherein said voltage sensing means comprise a transistor, at least a portion of the charge on the capacitor is applied to a base of said transistor and the control voltage is applied to an emitter of said transistor.

5. The synchronization circuit of claim wherein the source of constant, non-variable direct current is a source of constant voltage electrically connected to each said capacitor through only an electrical resistor in each said signal circuit.

6. In a synchronization circuit for synchronizing signals with respect to each phase of a polyphase alternating current, including a plurality of pulse generating circuits, each one of said pulse generating circuits being associated, respectively with each phase of said polyphase alternating current, each of said pulse generating circuits including means for generating a ramp voltage during each cycle of the phase of said polyphase alternating current associated with said pulse generating circuit, and sensing means for sensing said ramp voltage, the improvement comprising (1) means in each of said pulse generating circuits for initiating said ramp voltage at the same invariable point in each cycle of its associated phase of said polyphase alternating current, said point being identical for each of said pulse generating circuits with respect to its associated phase, the slope of said ramp voltage being identical and non-variable for each of said pulse generating circuits and (2) a variable reference voltage operatively connected to said sensing means in each of said pulse generating circuits, said reference voltage being instantaneously identical in all of said pulse generating circuits, said sensing means comparing said reference voltage with said ramp voltage of said pulse generating circuit and emitting a signal when said ramp voltage bears a fixed functional relationship to said reference voltage.

References Cited

UNITED STATES PATENTS

| 2,741,742 | 4/1956 | Moore | 324—68 |
| 3,273,041 | 9/1966 | Strohmeier et al. | 307—252 X |
| 3,281,645 | 10/1966 | Spink | 307—252 X |
| 3,297,883 | 1/1967 | Schulmeyer et al. | 307—228 |
| 3,075,136 | 1/1963 | Jones | 307—252 XR |
| 3,114,098 | 12/1963 | Rallo et al. | 321—18 |
| 3,183,372 | 5/1965 | Chin | 307—252 |

DONALD D. FORRER, Primary Examiner

STANLEY D. MILLER, Assistant Examiner

U.S. Cl. X.R.

307—228, 246, 252, 295; 328—78, 179

UNITED STATES PATENT OFFICE
CERTIFICATE OF CORRECTION

Patent No. 3,514,639                            May 26, 1970

Philip M. Gundlach et al.

It is certified that error appears in the above identified patent and that said Letters Patent are hereby corrected as shown below:

Column 1, line 19, "including" should read -- includes --. Column 2, line 1, "FIGURES" should read -- FIGURE --; line 56, "diagram" should read -- diagrammatic --. Column 3, line 69, "capacitotrs" should read -- capacitors --. Column 7, line 17, after "the" insert -- other --; line 27, after "claim" insert -- 1 --.

Signed and sealed this 5th day of January 1971.

(SEAL)
Attest:

Edward M. Fletcher, Jr.                        WILLIAM E. SCHUYLER, JR.
Attesting Officer                                Commissioner of Patents